(12) United States Patent
Saito et al.

(10) Patent No.: US 8,712,621 B2
(45) Date of Patent: Apr. 29, 2014

(54) VEHICLE HAVING POWER SUPPLY APPARATUS

(71) Applicant: Mitsubishi Jidosha Kogyo Kabushiki Kaisha, Tokyo (JP)

(72) Inventors: Jun Saito, Okazaki (JP); Hiroyasu Suzuki, Nagoya (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/848,892

(22) Filed: Mar. 22, 2013

(65) Prior Publication Data

US 2013/0261861 A1 Oct. 3, 2013

(30) Foreign Application Priority Data

Mar. 27, 2012 (JP) ................... 2012-072153

(51) Int. Cl.
*G06F 7/00* (2006.01)
*B60G 17/0185* (2006.01)
*B60G 17/0195* (2006.01)
*B60R 16/03* (2006.01)

(52) U.S. Cl.
CPC ........ *B60G 17/0185* (2013.01); *B60G 17/0195* (2013.01); *B60G 2600/08* (2013.01); *B60R 16/0315* (2013.01); *B60R 2016/0322* (2013.01)
USPC ................. 701/22; 701/41; 701/42; 701/532; 180/427; 180/428; 180/442; 180/443; 180/444; 74/422; 74/498; 137/625.23; 191/2; 191/3; 340/5.64; 307/10.1; 323/282

(58) Field of Classification Search
CPC .. B60G 17/0185; B60G 2600/08; B60L 1/00; B60L 15/20; H02J 5/005
USPC .................... 701/22, 532; 191/2, 3; 323/282; 340/5.64
See application file for complete search history.

(56) References Cited

U.S. PATENT DOCUMENTS

| | | | |
|---|---|---|---|
| 6,182,807 B1 * | 2/2001 | Saito et al. ......... | 191/2 |
| 6,401,891 B1 * | 6/2002 | Saito et al. ......... | 191/2 |
| 6,408,998 B1 * | 6/2002 | Saito et al. ......... | 191/2 |
| 6,479,973 B2 * | 11/2002 | Saito et al. ......... | 323/282 |
| 6,769,521 B2 * | 8/2004 | Saito et al. ......... | 191/2 |

FOREIGN PATENT DOCUMENTS

JP 2000-234539 A 8/2000

* cited by examiner

*Primary Examiner* — McDieunel Marc
(74) *Attorney, Agent, or Firm* — Birch, Stewart, Kolasch & Birch, LLP

(57) ABSTRACT

A vehicle having a power supply apparatus which is configured to supply an electric power to an external apparatus outside the vehicle, includes: a detecting unit which is configured to detect a state where a cable is pinched between an opening and closing member of the vehicle and an opening edge of an opening for the opening and closing member, the cable connecting the power supply apparatus to the external apparatus and being arranged in an interior of the vehicle; and an inhibiting unit which, when the detecting unit detects that the cable is pinched between the opening and closing member and the opening edge, is configured to inhibit running of the vehicle.

5 Claims, 5 Drawing Sheets

VEHICLE HAVING POWER SUPPLY APPARATUS

CROSS-REFERENCE TO RELATED APPLICATION(S)

This application is based upon and claims the benefit of priority from prior Japanese patent application No. 2012-072153, filed on Mar. 27, 2012, the entire contents of which are incorporated herein by reference.

BACKGROUND

The presently disclosed subject matter relates to a vehicle which can supply an electric power from, for example, a battery for supplying an electric power to a motor for running, to an external apparatus outside the vehicle.

In the field of an electric vehicle including a motor for running and a battery for supplying an electric power to the motor, conventionally, there is a technique for enabling an electric power to be supplied from such a battery to an external apparatus outside the vehicle. Specifically, a receptacle outlet is disposed in the interior of the vehicle, and a cable of the external apparatus is connected to the outlet (for example, see JP-A-2000-234539).

In a state where en electric power is to be supplied from the battery to the external apparatus outside the vehicle, on the other hand, an AC converter which converts the DC current of the battery to an AC current must be activated. Therefore, the electric vehicle is in a running enabled state.

In the state where en electric power is supplied to the external apparatus outside the vehicle, the driver is often outside the vehicle, and therefore there is a possibility that the electric vehicle is stolen. Consequently, it is requested to, in the state where en electric power is supplied to the external apparatus outside the vehicle, disable the electric vehicle from being started.

SUMMARY

The presently disclosed subject matter may provide a vehicle having a power supply apparatus which, in the state where en electric power is supplied to an external apparatus outside the vehicle, can disable the vehicle from being started.

The vehicle having a power supply apparatus which is configured to supply an electric power to an external apparatus outside the vehicle may comprise: a detecting unit which is configured to detect a state where a cable is pinched between an opening and closing member of the vehicle and an opening edge of an opening for the opening and closing member, the cable connecting the power supply apparatus to the external apparatus and being arranged in an interior of the vehicle; and an inhibiting unit which, when the detecting unit detects that the cable is pinched between the opening and closing member and the opening edge, is configured to inhibit running of the vehicle.

The detecting unit may be a switch which is disposed in one of the opening and closing member and the opening edge, and which detects that the cable is pinched between the opening and closing member and the opening edge, when the cable is pinched between the opening and closing member and the opening edge, and the switch is pressed by the cable.

A recessed portion, which is configured to accommodate the cable when the cable is pinched between the opening and closing member and the opening edge, may be disposed in at least one of the opening and closing member and the opening edge, and the switch may be disposed in the recessed portion.

The inhibiting unit may inhibit the running of the vehicle by setting a parking lock mechanism to a locked state.

The inhibiting unit may inhibit the running of the vehicle by stopping a motor for running mounted on the vehicle.

DETAILED DESCRIPTION OF EXEMPLARY EMBODIMENTS

Figure 1:
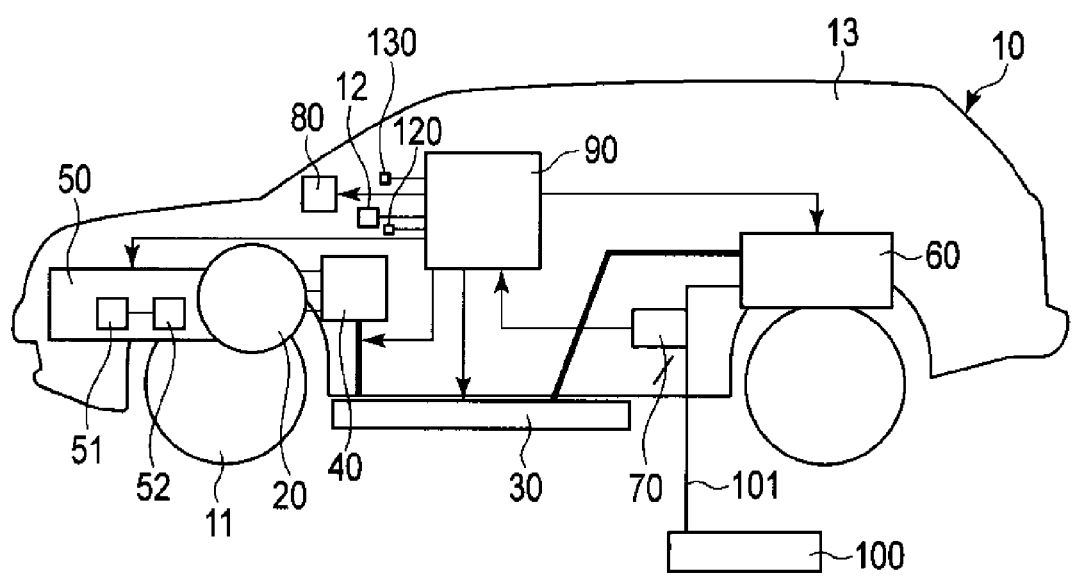
FIG. 1 is a diagram showing an electric vehicle in a first embodiment of the presently disclosed subject matter.

A vehicle having a power supply apparatus of a first embodiment of the presently disclosed subject matter will be described with reference to FIGS. 1 to 6. FIG. 1 is a diagram showing an electric vehicle 10 which is an example of the vehicle having a power supply apparatus. As shown in FIG. 1, the electric vehicle 10 includes a motor 20 for running, a battery 30, an inverter 40 for running, a transmission 50, an inverter 60 for an external power supply, a cable pinch detection switch 70, a warning lamp 80, and an ECU (Electric Control Unit) 90.

The rotation of the output shaft of the motor 20 is subjected to a shifting operation by the transmission 50, and then transmitted to front wheels 11. The transmission 50 is of a shift-by-wire system, and therefore includes a driving unit 51 therein. When a shift lever 12 is operated by the driver, the driving unit 51 performs the shifting operation based on instructions from the ECU 90 which will be described later.

The transmission 50 further includes a parking lock mechanism 52. When the shift lever 12 is in a parking position, the ECU 90 issues instructions for setting the parking lock mechanism 52 to the locked state, to the driving unit 51. The rotations of gears in the transmission 50 are locked by setting the parking lock mechanism 52 to the locked state. Therefore, the front wheels 11 cannot be rotated, and hence the electric vehicle 10 is disabled from running.

When the electric vehicle 10 runs, the running inverter 40 converts an electric power supplied from the battery 30, to a power corresponding to the request from the driver, and then supplies the power to the motor 20. For example, the request from the driver is a press down force applied on an accelerator pedal or the like, and is an instruction for acceleration or deceleration of the electric vehicle 10, or the like.

The external-power supply inverter 60 can supply an electric power supplied from the battery 30 to an external apparatus 100. A cable 101 of the external apparatus 100 is electrically connectable to the external-power supply inverter 60 of the electric vehicle 10. In the external-power supply inverter 60, a receptacle outlet is disposed as an example of a connector to which the cable 101 is to be electrically connected. When the cable 101 is electrically connected to the external-power supply inverter 60, the electric power is supplied from the battery 30 to the external apparatus 100 through the external-power supply inverter 60. The external-power supply inverter 60 converts the DC current supplied from the battery 30 to a state suitable for the external apparatus 100, and then supplies it to the external apparatus 100. The setting to a state suitable for the external apparatus 100 includes conversion of the DC current supplied from the battery 30 to an AC current.

Figure 2:
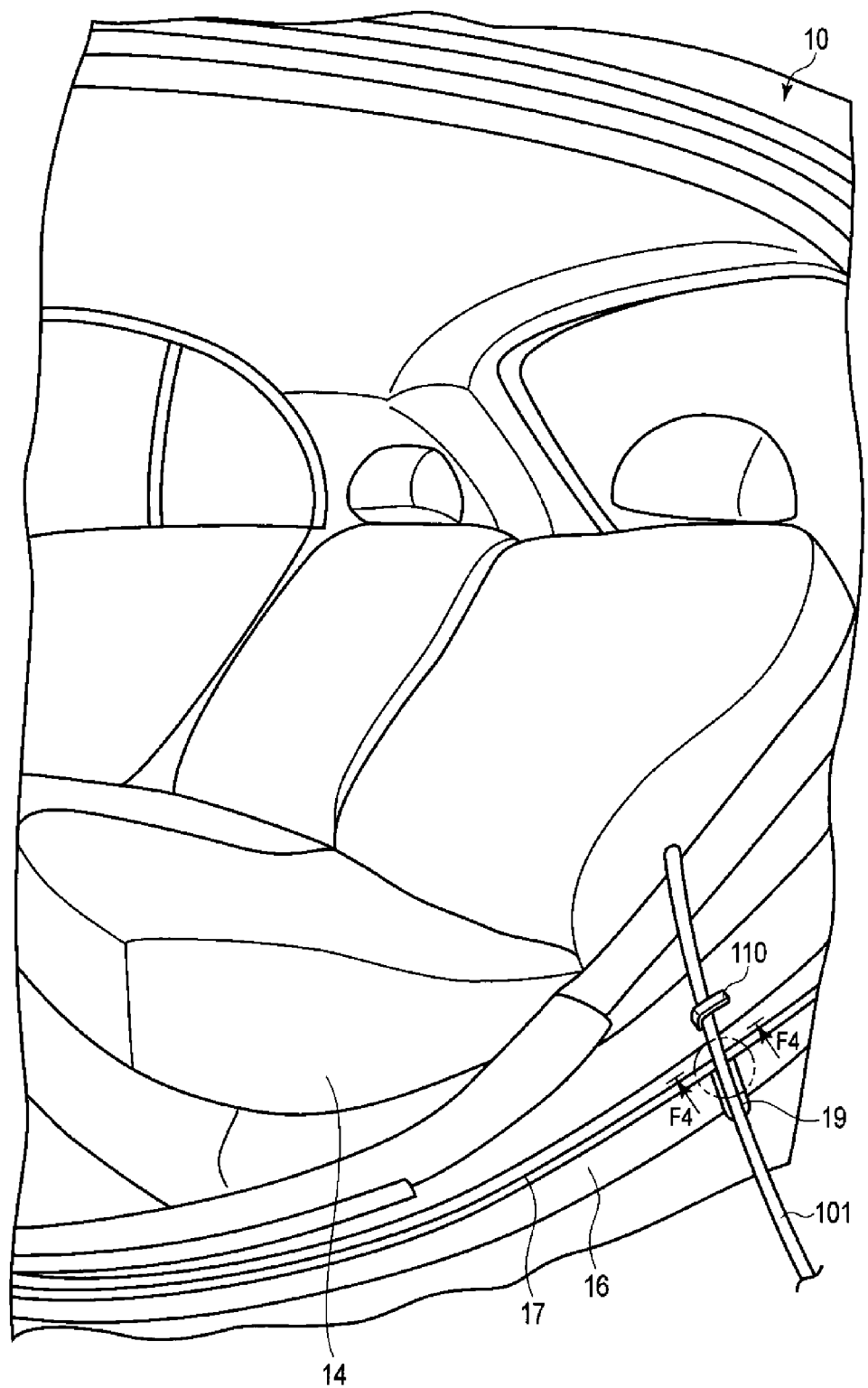
FIG. 2 is a perspective view showing the interior of the electric vehicle.
Figure 3:
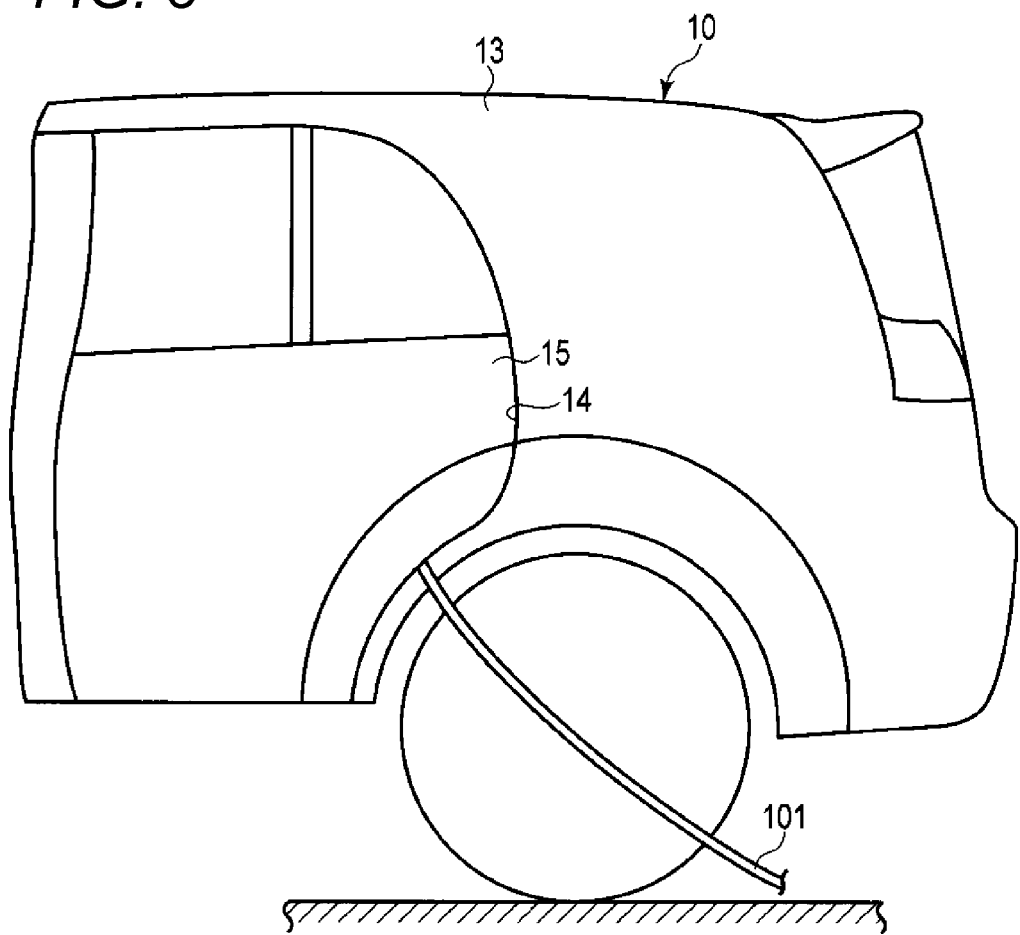
FIG. 3 is a side view showing a state where a rear door of the electric vehicle is closed.

FIG. 2 is a perspective view showing the interior of the electric vehicle 10. FIG. 2 shows a state where the cable 101 is connected to the external-power supply inverter 60. As shown in FIG. 2, the cable 101 passes through a passenger opening 14 which is formed in a vehicle body 13. In the embodiment, for example, the opening 14 is an opening for a rear door of the electric vehicle 10. FIG. 2 shows a state where a door 15 which opens and closes the opening 14 is opened. FIG. 3 is a side view of the electric vehicle 10 showing a state where the door 15 is closed.

As shown in FIG. 2, a weather strip 17 is disposed in a peripheral portion (opening edge) 16 of the opening 14. The peripheral portion (opening edge) 16 is an example of a door opening edge (door frame) of the vehicle body. The weather strip 17 is annually disposed so as to surround the opening 14. As shown in FIG. 2, moreover, a holding clip 110 which is an example of a holding element for holding the cable 101 is disposed in the peripheral portion (opening edge) 16.

In the state where the cable 101 is connected to the external-power supply inverter 60, when the cable 101 is held by the holding clip 110, the cable 101 can be fixed. In other words, the position of the cable 101 with respect to the peripheral portion (opening edge) 16 of the opening 14 can be fixed.

Figure 4:
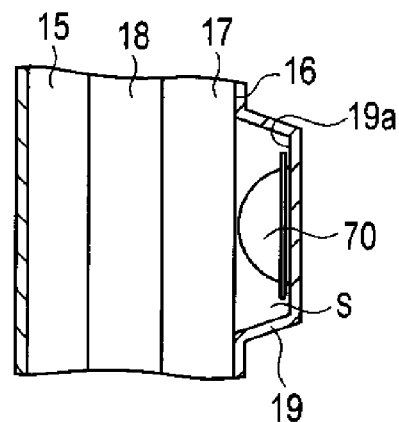
FIG. 4 is a sectional view of the electric vehicle, taken along line F4-F4 in FIG. 2.

FIG. 4 is a sectional view of the electric vehicle 10 in a state where the door 15 is in a closing position, i.e., in a state where the door 15 is closed, taken along line F4-F4 in FIG. 2. In FIG. 4, the portions in the peripheral portion (opening edge) 16 of the opening 14 which are on the outer side of the vehicle with respect to the weather strip 17 are cut away, and the inner side is viewed from the outer side in the direction along which the cable 101 elongates.

As shown in FIG. 4, in the state where the door 15 is closed, the weather strip 17 which is disposed in the peripheral portion (opening edge) 16, and a weather strip 18 which is disposed on the door 15 are pressed against each other, whereby the opening 14 is liquid-tightly sealed.

In the peripheral portion (opening edge) 16, a recessed portion 19 is disposed in a portion on which the weather strip 17 is overlaid. The recessed portion 19 is recessed in the direction of separating from the weather strip 17. Therefore, an accommodating space S is disposed between the lower surface 19a of the recessed portion 19 and the weather strip 17. The cable pinch detection switch 70 is disposed in the recessed portion 19. Moreover, the recessed portion 19 is used also as a cable accommodating portion for allowing a cable to be arranged from the interior of the vehicle to the outside of the vehicle.

Figure 5:
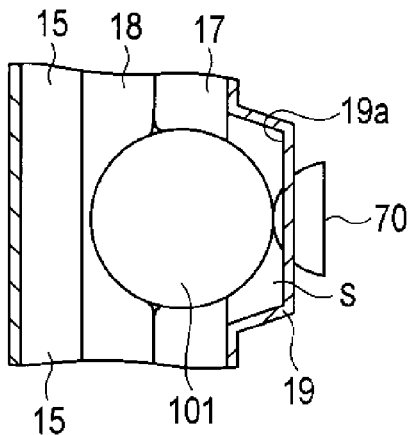
FIG. 5 is a sectional view showing a state where, when a cable for connecting an external-power supply inverter in the electric vehicle to an external apparatus is connected to the external-power supply inverter, the door of the electric vehicle is closed, taken in a similar manner as FIG. 4.

FIG. 5 is a sectional view showing a state where the door 15 is closed in a state where the cable 101 is connected to the external-power supply inverter 60, in a similar manner as FIG. 4. As shown in FIG. 2, when the cable 101 is held by the holding clip 110, the position of the cable 101 is determined with respect to the peripheral portion (opening edge) 16. Namely, the cable 101 is arranged from the interior of the vehicle to the outside of the vehicle while being accommodated in the recessed portion 19 formed in the portion on which the weather strip 17 is overlaid. Specifically, the cable 101 is located at a position where the cable 101 is opposed to the recessed portion 19.

When the door 15 is closed, therefore, the weather strip 17 which is disposed in the peripheral portion (opening edge) 16, and the weather strip 18 which is disposed on the door 15 are deformed in accordance with the cable 101 as shown in FIG. 5. At this time, the weather strip 17 which is disposed in the peripheral portion (opening edge) 16 enters the recessed portion 19, and presses the cable pinch detection switch 70. In the state where the cable 101 is not pinched between the door 15 and the opening 14 as shown in FIG. 4, the weather strip 17 is not in contact with the cable pinch detection switch 70, and therefore a state where the cable pinch detection switch 70 is not pressed is attained.

When the cable pinch detection switch 70 is pressed as shown in FIG. 5, it supplies a signal to the ECU 90. In a state where the cable pinch detection switch 70 is not pressed, it does not output the signal.

The recessed portion 19 has a size which is so designed as not to, in a state where the cable 101 is pinched as shown in FIG. 5, allow the weather strip 17 disposed in the peripheral portion (opening edge) 16 to enter the recessed portion 19 to damage the cable 101.

As described above, the ECU 90 controls the driving unit 51 of the transmission 50, the running inverter 40, and the external-power supply inverter 60.

Figure 6:
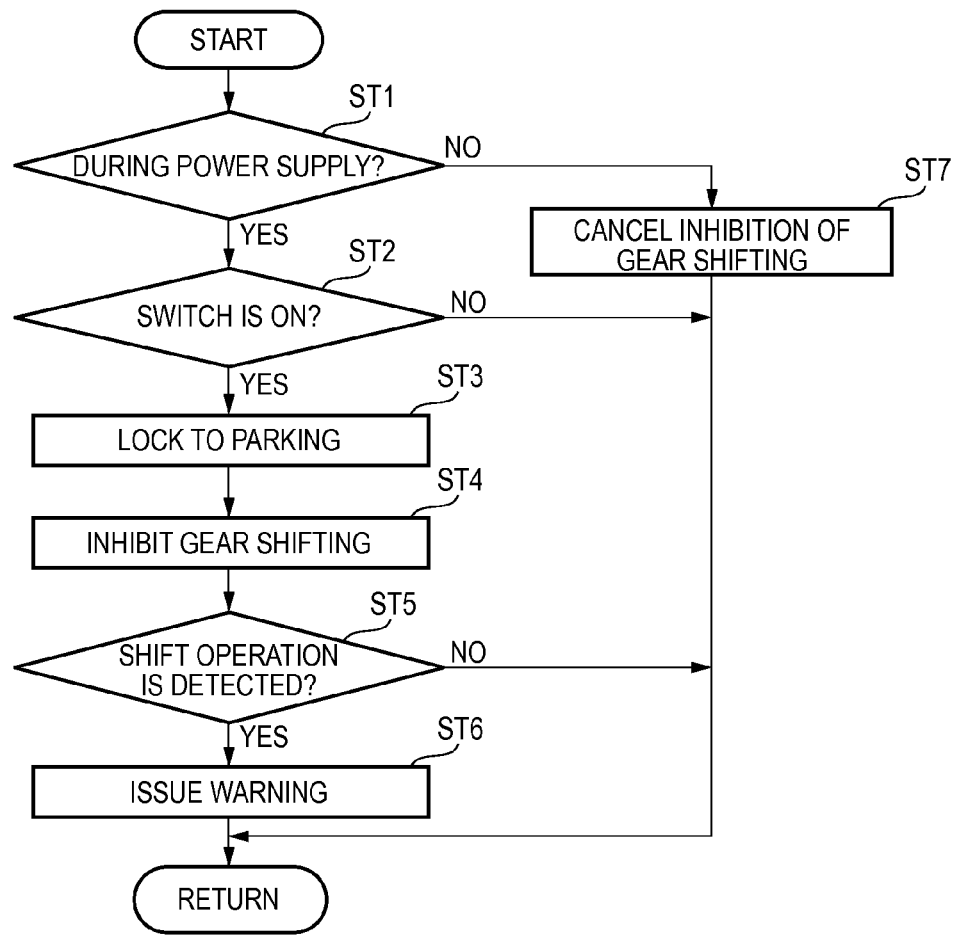
FIG. 6 is a flowchart showing the operation of an ECU of the electric vehicle.

FIG. 6 is a flowchart showing the operation of the ECU 90 in the case where the external-power supply inverter 60 supplies an electric power to the external apparatus 100. As shown in FIG. 6, the ECU 90 determines in step ST1 whether an electric power is supplied to the external apparatus 100 or not. Specifically, if the cable 101 is connected to the external-power supply inverter 60, the ECU 90 controls the external-power supply inverter 60 so as to supply the power to the external apparatus 100. Therefore, the ECU 90 always knows whether the power is supplied to the external apparatus 100 or not. In the embodiment, when the cable 101 is connected to the external-power supply inverter 60, the inverter 60 transmits a signal indicating that the cable 101 is connected, to the ECU 90. When receiving the signal, the ECU 90 determines that the cable 101 is connected, and controls the external-power supply inverter 60 so as to supply an electric power to the external apparatus 100. If an electric power is supplied to the external apparatus 100, the process proceeds to step ST2.

In step ST2, the ECU 90 determines whether the cable pinch detection switch 70 transmits the signal or not. If the signal from the cable pinch detection switch 70 is received, the process proceeds to step ST3.

In step ST3, the ECU 90 determines that the door 15 is closed in the state where the cable 101 is connected to the external-power supply inverter 60, and causes the driving unit 51 to set the parking lock mechanism 52 to the locked state. As a result of the process of step ST3, the parking lock mechanism 52 is set to the locked state, and therefore the electric vehicle 10 is in a state where the electric vehicle cannot travel.

In the state where an electric power is supplied to the external apparatus 100 placed outside the vehicle, the shift lever 12 is usually placed at the parking position. Therefore, the shift lever 12 has been set to the locked state before an electric power is supplied to the external apparatus 100. In the case where, in step ST3, the parking lock mechanism 52 is already in the locked state, the process proceeds directly to step ST4.

In step ST4, the ECU 90 inhibits gear shifting. Specifically, in order to prevent the position of the shift lever 12 from being moved, a lock mechanism 129 for stopping movement of the shift lever 12 is set to a locked state. Therefore, the shift lever 12 is inhibited from movement from the parking position. Then, the process proceeds to step ST5.

In step ST5, the ECU 90 determines whether the shift lever 12 is operated or not. The shift lever 12 is inhibited in step ST4 from movement from the parking position. When a load is applied to the shift lever 12, therefore, this is detected by a sensor 130. When detecting that a load is input to the shift lever 12, the sensor 130 transmits a signal to the ECU 90. When receiving the signal from the sensor 130, the ECU 90 detects that the shift lever 12 is operated. If it is detected that the shift lever 12 is operated, then the process proceeds to step ST6.

In step ST6, the ECU 90 causes the warning lamp 80 to light up. The state where the warning lamp 80 lights up means a state where, during a period when the cable 101 is pinched between the door 15 and the peripheral portion (opening edge) 16 of the opening 14, the driver tries to start the electric vehicle 10. In the state where the warning lamp 80 lights up, the shift lever 12 is fixed to the parking position, and the ECU 90 does not control the driving unit 51 of the transmission 50. Therefore, the parking lock mechanism 52 is in the locked state, and hence the electric vehicle 10 is in the state where it cannot run. When the warning lamp 80 lights up, the driver reacknowledges the above-described state.

When the power supply to the external apparatus 100 is ended, the process proceeds from step ST1 to step ST7. In step ST7, the ECU 90 cancels the inhibition of gear shifting. If it is determined in step ST2 that the cable pinch detection switch 70 is not turned ON, or in other words, in a state where the signal from the cable pinch detection switch 70 is not received, the process returns to step ST1. When the power is supplied to the external apparatus 100 in a state where the door 15 is opened, for example, the cable 101 is not pinched between the door 15 and the peripheral portion (opening edge) 16 of the opening 14, and hence the cable pinch detection switch 70 is in the OFF state and does not transmit the signal to the ECU 90. If the shift lever 12 is not operated in step ST5, the process returns to step ST1. The operations subsequent to step ST1 are executed at preset intervals.

The thus-configured electric vehicle 10 cannot run in the state where the cable 101 is pinched between the door 15 and the peripheral portion (opening edge) 16 of the opening 14. In the case where the driver leaves the driver's seat during the power supply to the external apparatus 100, for example, the door 15 is closed for the sake of safety. At this time, the cable 101 is pinched between the door 15 and the peripheral portion (opening edge) 16 of the opening 14, and hence the electric vehicle 10 is inhibited from running. Therefore, the electric vehicle 10 is prevented from being stolen.

Since the cable pinch detection switch is used as a unit which detects the state where the cable 101 is pinched, the structure of the unit which detects the state where the cable 101 is pinched can be made simple.

The recessed portion 19 is disposed in the peripheral portion (opening edge) 16 of the opening 14. Even when the door 15 is closed, therefore, the cable 101 is prevented from being damaged.

The parking lock mechanism 52 is used as a unit which inhibits the start of running of the electric vehicle 10 in the state where the cable 101 is pinched. Therefore, the electric vehicle 10 can be simplified in structure by the use of the existing parking lock mechanism 52.

Next, a vehicle having a power supply apparatus of a second embodiment of the presently disclosed subject matter will be described with reference to FIG. 7. The components which have similar functions as those of the first embodiment are denoted by the same reference numerals, and their description is omitted. In the embodiment, the unit which inhibits the start of running of the electric vehicle 10 in the state where the cable 101 is pinched between the door 15 and the peripheral portion (opening edge) 16 of the opening 14 is different from that in the first embodiment. The others are identical with those in the first embodiment. The different configuration will be described.

In the embodiment, as the unit which inhibits the start of running of the electric vehicle 10 in the state where the cable 101 is pinched between the door 15 and the peripheral portion (opening edge) 16 of the opening 14, the parking lock mechanism 52 is not used, and the stop of the power supply to the motor 20 is employed.

Figure 7:
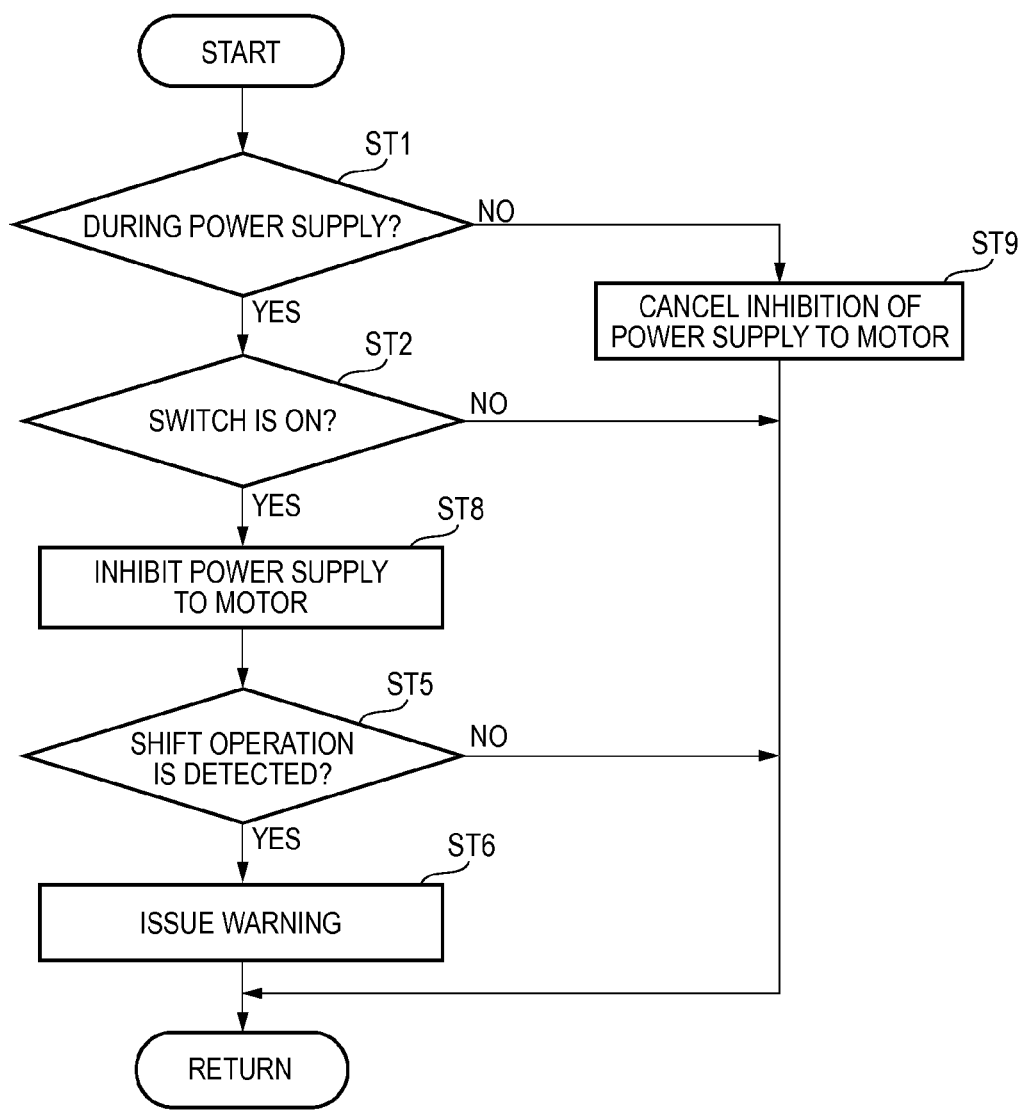
FIG. 7 is a flowchart showing the operation of an ECU of an electric vehicle in a second embodiment of the presently disclosed subject matter.

FIG. 7 is a flowchart showing the operation of the ECU 90 in the embodiment. In the embodiment, as shown in FIG. 7, step ST8 is executed in place of steps ST3 and ST4 which have been described in the first embodiment, and step ST9 is executed in place of step ST7.

If it is detected in step ST2 that the cable pinch detection switch 70 is turned ON, or in other words, if the signal from the cable pinch detection switch 70 is received, the process proceeds to step ST8. In step ST8, the ECU 90 controls the running inverter 40 so as to set the power supply to the motor 20 to an inhibited state. The inhibited state of the power supply to the motor 20 means a state where, even when the accelerator pedal is pressed down after the shift lever 12 is moved from the parking position to the drive position, the electric power is not supplied to the motor 20.

In the embodiment, the process of fixing the shift lever 12 to the parking position is not performed. After the process of step ST8, therefore, the driver who wishes to start the electric vehicle 10 can change the position of the shift lever 12 from the parking position to the drive position.

If the ECU 90 detects in step ST5 that the shift lever 12 is operated as described above, the process proceeds to step ST6. In step ST6, the inhibited state of the power supply to the motor 20 has been already set, and therefore the electric vehicle 10 is not started even when the driver presses down the accelerator pedal. When the driver confirms that the warning lamp 80 lights up, the driver recognizes that the power supply to the external apparatus 100 is being performed.

If the ECU 90 detects in step ST1 that the cable 101 is disconnected from the external-power supply inverter 60, the process proceeds to step ST9. In step ST9, the ECU 90 cancels the inhibited state of the power supply to the motor 20. In the embodiment, when detecting that the electrical connection with the cable 101 is canceled, the external-power supply inverter 60 transmits a signal indicative of the canceled state to the ECU 90. When receiving the signal, the ECU 90 determines that the power supply to the external apparatus 100 is not performed.

Also in the embodiment, it is possible to attain similar effects as the first embodiment.

In the first and second embodiments, the recessed portion 19 is formed in the peripheral portion (opening edge) 16 of the opening 14. Alternatively, the recessed portion 19 may be formed in the door 15, and the cable pinch detection switch 70 may be disposed in the recessed portion 19. Alternatively, recessed portions may formed in both the door 15 and the opening 14, respectively, and the cable pinch detection switch 70 may be disposed in one or both of the recessed portions.

In the first and second embodiments, the electric vehicle 10 is used as an example of the vehicle. Alternatively, a hybrid electric vehicle which includes an internal combustion engine and an electric motor as a travel driving source may be used.

In the first and second embodiments, the door 15 is used as an example of an opening and closing member in the vehicle. The opening and closing member includes not only a door but also a trunk lid.

In the first and second embodiments, the warning lamp 80 is used as an example of a unit for warning the driver when the electric vehicle 10 tries to start in the state where the cable 101 is pinched. In another example of the warning unit, an acoustic warning may be issued to the driver.

In the first and second embodiments, the ECU 90, the battery 30, and the external-power supply inverter 60 constitute an example of a power supply apparatus which can supply an electric power to an external apparatus outside the vehicle.

In the first and second embodiments, the cable pinch detection switch 70 is an example of a cable pinch state detecting unit which detects the state where the cable is pinched between the door and the door frame.

In the first embodiment, the ECU 90, the parking lock mechanism 52, and the driving unit 51 constitute an example of a running inhibiting unit which, when the cable pinch state detecting unit detects that the cable is pinched between the door and the door frame, inhibits running.

In the second embodiment, the ECU 90 prohibits the power supply to the motor 20, thereby inhibiting the electric vehicle 10 from running. The ECU 90 is an example of the running inhibiting unit which, when the cable pinch state detecting unit detects that the cable is pinched between the door and the door frame, inhibits running.

The presently disclosed subject matter is not restricted to the above-described embodiments, and, in the stage of implementation, the presently disclosed subject matter can be embodied while the components are variously modified without departing the spirit of the presently disclosed subject matter. For example, the electric vehicle may be a hybrid vehicle on which an internal combustion engine is mounted. By appropriate combinations of plural components disclosed in the embodiments, the presently disclosed subject matter can be configured. For example, some of the components can be omitted from all of the components shown in the embodiments. Moreover, the components in different embodiments can be appropriately combined.

According to an aspect of the presently disclosed subject matter, in the state where en electric power is supplied to an external apparatus outside the vehicle, the start of running is disabled.

What is claimed is:

1. A vehicle having a power supply apparatus which is configured to supply an electric power to an external apparatus outside the vehicle, the vehicle comprising:
    a detecting unit which is configured to detect a state where a cable is pinched between an opening and closing member of the vehicle and an opening edge of an opening for the opening and closing member, the cable connecting the power supply apparatus to the external apparatus and being arranged in an interior of the vehicle; and
    an inhibiting unit which, when the detecting unit detects that the cable is pinched between the opening and closing member and the opening edge, is configured to inhibit running of the vehicle.

2. The vehicle according to claim 1, wherein
    the detecting unit is a switch which is disposed in one of the opening and closing member and the opening edge, and which detects that the cable is pinched between the opening and closing member and the opening edge, when the cable is pinched between the opening and closing member and the opening edge, and the switch is pressed by the cable.

3. The vehicle according to claim 2, wherein
    a recessed portion, which is configured to accommodate the cable when the cable is pinched between the opening and closing member and the opening edge, is disposed in at least one of the opening and closing member and the opening edge, and
    the switch is disposed in the recessed portion.

4. The vehicle according to claim 1, wherein
    the inhibiting unit inhibits the running of the vehicle by setting a parking lock mechanism to a locked state.

5. The vehicle according to claim 1, wherein
    the inhibiting unit inhibits the running of the vehicle by stopping a motor for running mounted on the vehicle.

* * * * *